(12) United States Patent
Ishida

(10) Patent No.: US 8,337,123 B2
(45) Date of Patent: Dec. 25, 2012

(54) CUTTING INSERT, CUTTING TOOL, AND CUTTING METHOD USING THE CUTTING TOOL

(75) Inventor: Takuya Ishida, Shiga (JP)

(73) Assignee: KYOCERA Corporation, Kyoto (JP)

( * ) Notice: Subject to any disclaimer, the term of this patent is extended or adjusted under 35 U.S.C. 154(b) by 672 days.

(21) Appl. No.: 12/601,756

(22) PCT Filed: Apr. 25, 2008

(86) PCT No.: PCT/JP2008/058104
§ 371 (c)(1),
(2), (4) Date: Nov. 24, 2009

(87) PCT Pub. No.: WO2008/146563
PCT Pub. Date: Dec. 4, 2008

(65) Prior Publication Data
US 2010/0179555 A1    Jul. 15, 2010

(30) Foreign Application Priority Data
May 28, 2007  (JP) ................. 2007-140801

(51) Int. Cl.
*B23C 5/20* (2006.01)
(52) U.S. Cl. .......................................... 407/42; 407/113
(58) Field of Classification Search .......... 407/113–116, 407/48, 61, 42; *B23B 51/00*
See application file for complete search history.

(56) References Cited

U.S. PATENT DOCUMENTS

| | | | | |
|---|---|---|---|---|
| 4,645,384 A | * | 2/1987 | Shimomura et al. | 407/42 |
| 4,946,318 A | * | 8/1990 | David et al. | 407/42 |
| 5,052,863 A | * | 10/1991 | Satran | 407/113 |
| 5,071,292 A | * | 12/1991 | Satran | 407/116 |
| 5,221,164 A | * | 6/1993 | Allaire | 407/113 |
| 5,368,418 A | * | 11/1994 | Bentjens et al. | 407/114 |
| 5,443,334 A | * | 8/1995 | Pantzar | 407/113 |
| 5,460,464 A | * | 10/1995 | Arai et al. | 407/114 |
| 5,593,255 A | * | 1/1997 | Satran et al. | 407/113 |
| 5,688,083 A | * | 11/1997 | Boianjiu | 408/224 |
| 5,720,583 A | | 2/1998 | Bohnet et al. | |
| 5,853,267 A | | 12/1998 | Satran et al. | |
| 5,921,721 A | * | 7/1999 | Hintze et al. | 407/113 |
| 5,947,650 A | * | 9/1999 | Satran et al. | 407/113 |
| 5,971,672 A | * | 10/1999 | Hansson | 407/114 |
| 6,722,824 B2 | * | 4/2004 | Satran et al. | 407/113 |
| 6,742,970 B2 | * | 6/2004 | Oles et al. | 407/113 |
| 6,884,006 B2 | * | 4/2005 | Nagashima | 407/34 |
| 6,929,427 B2 | * | 8/2005 | Satran | 407/42 |
| 6,945,740 B2 | * | 9/2005 | Svenningsson et al. | 407/61 |
| 6,957,935 B2 | * | 10/2005 | Sung et al. | 407/113 |
| 7,040,844 B1 | * | 5/2006 | Daiguji | 407/113 |
| 7,281,884 B2 | * | 10/2007 | Maeda et al. | 407/113 |

(Continued)

FOREIGN PATENT DOCUMENTS

JP    62130107 A  *  6/1987

(Continued)

*Primary Examiner* — Andrea Wellington
*Assistant Examiner* — Sara Addisu
(74) *Attorney, Agent, or Firm* — Procopio, Cory, Hargreaves & Savitch LLP

(57) ABSTRACT

A cutting insert and a cutting tool, with which concentration of stress on a flank corresponding to a first cutting edge (main cutting edge) comprising a plurality of surfaces is reduced, and to provide a cutting method using the cutting tool.

15 Claims, 6 Drawing Sheets

U.S. PATENT DOCUMENTS

| | | | |
|---|---|---|---|
| 7,591,614 B2 * | 9/2009 | Craig | 407/66 |
| 7,905,687 B2 * | 3/2011 | Dufour et al. | 407/42 |
| 7,972,091 B2 * | 7/2011 | Svenningsson et al. | 407/113 |
| 8,025,465 B2 * | 9/2011 | Ishida | 407/114 |
| 8,057,132 B2 * | 11/2011 | Johansson et al. | 407/113 |
| 8,142,113 B2 * | 3/2012 | Ishida | 407/113 |
| 8,277,151 B2 * | 10/2012 | Wandeback | 407/42 |
| 2002/0102139 A1 | 8/2002 | Svensson | |
| 2003/0170079 A1 * | 9/2003 | Daiguji et al. | 407/34 |
| 2004/0109733 A1 * | 6/2004 | Fouquer | 407/113 |
| 2008/0260476 A1 | 10/2008 | Ishida | |
| 2010/0329804 A1 * | 12/2010 | Okumura | 408/1 R |

FOREIGN PATENT DOCUMENTS

| | | | |
|---|---|---|---|
| JP | 7-246505 | | 9/1995 |
| JP | 7-276130 | | 10/1995 |
| JP | 07276130 A | * | 10/1995 |
| JP | 2000-516152 | | 12/2000 |
| JP | 2002-178210 | | 6/2002 |
| JP | 2004-517745 | | 6/2004 |
| JP | 2007-83381 | | 4/2007 |
| JP | 2009285760 A | * | 12/2009 |
| JP | 2010099778 A | * | 5/2010 |

* cited by examiner

CUTTING INSERT, CUTTING TOOL, AND CUTTING METHOD USING THE CUTTING TOOL

CROSS REFERENCE TO RELATED APPLICATIONS

This application is the U.S. National Stage application of PCT application PCT/JP2008/058104 filed on Apr. 25, 2008, which claims priority under 35 U.S.C. §119 to Japanese Patent Application No. 2007-140810, filed May 28, 2007, and the contents of each of these applications are incorporated herein by reference in their entirety.

FIELD OF THE INVENTION

The present invention relates to a cutting insert used for a cutting tool, a cutting tool on which the cutting insert is mounted, and a cutting method using the cutting tool.

BACKGROUND

Cutting tools such as face mills, end mills, and in particular, throw-away cutting tools are widely used. Throw-away cutting tools, which are used by mounting cutting inserts on holders, are cost efficient.

For example, Patent Document 1 discloses a cutting insert comprising a main cutting edge (first cutting edge) at one corner and a secondary cutting edge (second cutting edge) at another corner. The cutting insert comprises a flank corresponding to the first cutting edge and a flank corresponding to the second cutting edge, the flanks being different from each other.

To be specific, in the cutting insert described in Patent Document 1, the flank corresponding to the first cutting edge is divided into a plurality of regions. Among the regions, a flank region A, which is connected to the first cutting edge, has the smallest clearance angle. A transition region B, which is connected to a lower side of the flank region A, has the largest clearance angle. A flank region C, which is connected to a lower side of the transition region B, has a clearance angle smaller than that of the transition region B. Moreover, the flank corresponding to the second cutting edge comprises basically a single surface having a clearance angle equal to that of the flank region C.

The flank region A, which is connected to the first cutting edge, comprises a segment I and a segment II. The segment I has a constant dimension in the thickness direction and a constant clearance angle of about 0 degrees. The segment II is connected to the flank corresponding to the second cutting edge. The segment II has a clearance angle that gradually increases from 0 degrees to the clearance angle of the flank connected to the second cutting edge. The flank connected to the second cutting edge has a constant dimension in the thickness direction and a constant clearance angle. The flank region A, which is connected to the first cutting edge, is connected to the flank connected to the second cutting edge.

However, the cutting insert described in Patent Document 1 is formed such that the transition region B, which is connected to the lower side of the flank region A connected to the first cutting edge, has the largest clearance angle among the flanks corresponding to the first cutting edge. That is, the flank region A, which is connected to the first cutting edge, protrudes by a large length toward a side of a body. Therefore, stress may concentrate on a connection portion between the transition region B and the flank region C connected to the lower side of the transition region B, and the stress may generate a crack in the connection portion. As a result, there is a problem in that the crack may cause a fracture of the cutting edge.

Patent Document 1: Japanese Unexamined Patent Application Publication No. 7-276130

SUMMARY

An object of the present invention is to provide a cutting insert and a cutting tool, with which concentration of stress on a flank corresponding to a first cutting edge (main cutting edge) comprising a plurality of surfaces is reduced, and to provide a cutting method using the cutting tool.

A cutting insert according to the present invention comprises an upper surface having a substantially polygonal shape, a lower surface, a side surface comprising a flank and a cutting edge at an intersection of the upper surface and the side surface. The cutting edge comprises a first cutting edge, a second cutting edge, and a third cutting edge between the first cutting edge and the second cutting edge being at a corner of the substantially polygonal shape in top view. The flank comprises a first flank corresponding to the first cutting edge, a second flank corresponding to the second cutting edge, and a third flank corresponding to the third cutting edge. The first flank comprises an upper flank connected to the first cutting edge, a middle flank on the lower surface side of the upper flank, and a lower flank on the lower surface side of the middle flank. An inequality $\alpha < \beta < \gamma < \epsilon$ is satisfied, where $\alpha$ is a clearance angle of the upper flank, $\beta$ is a clearance angle of the middle flank, $\gamma$ is a clearance angle of the lower flank, and $\epsilon$ is a clearance angle of the second flank.

A cutting tool according to the present invention comprises a holder and the cutting insert being mounted on a tip of the holder, wherein the second cutting edge of the cutting insert is substantially perpendicular to an axis of the holder.

A method of cutting a work material according to the present invention comprises the following steps (i) to (iii):
(i) rotating at least one of the cutting tool and the work material and bringing the work material and the cutting tool close to each other,
(ii) making a cutting edge of the cutting tool contact a surface of the work material and cutting the work material, and
(iii) separating the cutting tool from the work material.

ADVANTAGES

According to the present invention, concentration of stress on a flank corresponding to the first cutting edge comprising a plurality of surfaces is reduced, so that occurrence of a fracture of the cutting edge can be decreased and a good machining accuracy can be provided.

BRIEF DESCRIPTION OF DRAWINGS

FIG. 2(a) is a plan view and FIG. 2(b) is a side view of the cutting insert shown in FIG. 1.

DETAILED DESCRIPTION

<Cutting Insert>

Figure 1:
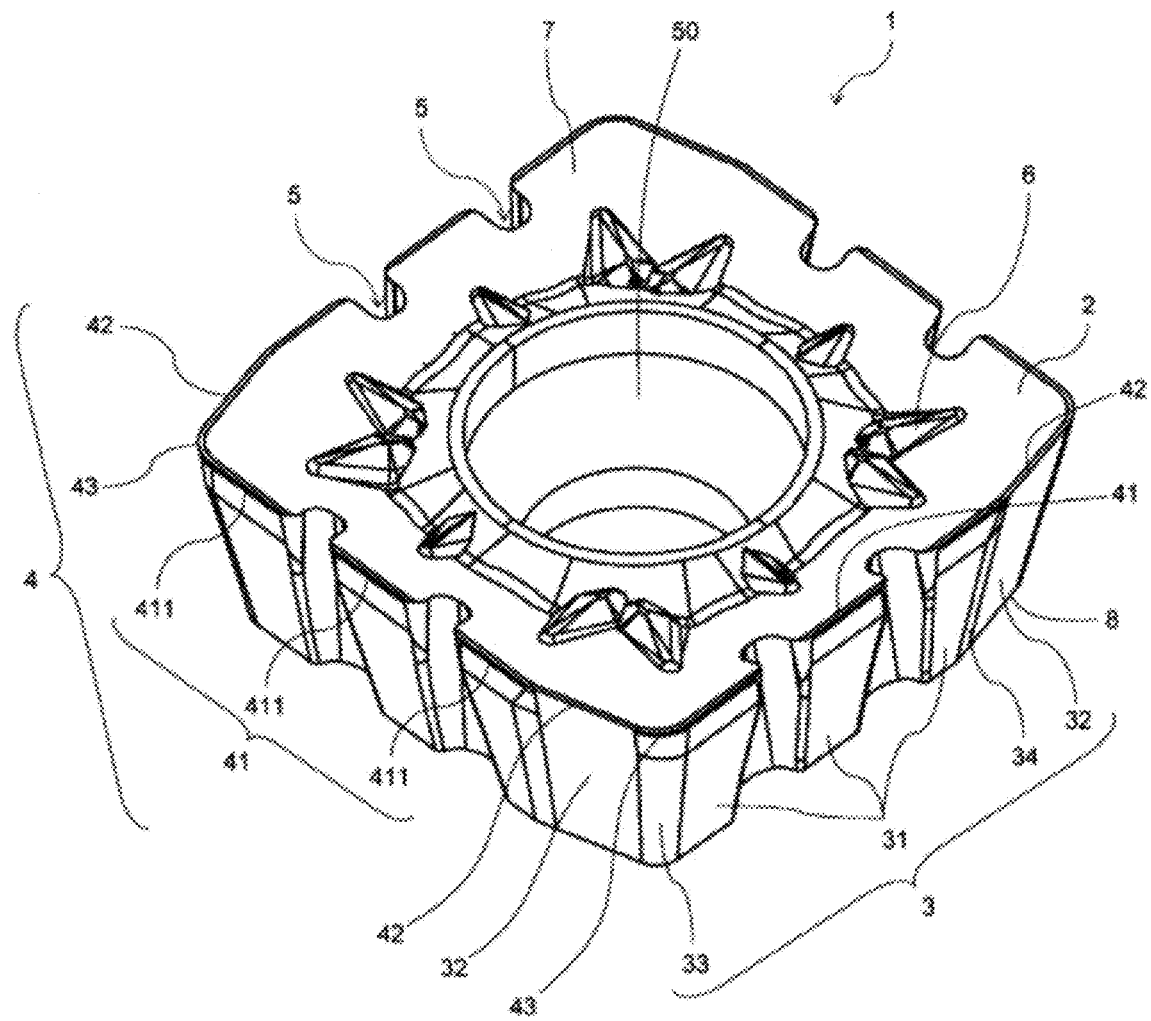
FIG. 1 is a perspective view of a cutting insert according to an embodiment of the present invention.

Hereinafter, a cutting insert (referred to as "insert") according to an embodiment of the present invention is described with reference to FIGS. 1 to 4. As illustrated in FIG. 1, an insert 1 of the embodiment comprises a body 7. The body 7 comprises an upper surface, a lower surface 8, and a side surface, the upper surface having a substantially polygonal shape. The body 7 comprises a rake face 2 on at least a part of the upper surface, a flank 3 on at least a part of the side surface, and a cutting edge 4 at an intersection of the rake face 2 and the flank 3.

The cutting edge 4 comprises a first cutting edge 41, a second cutting edge 42, and a third cutting edge 43. The third cutting edge 43 is disposed between the first cutting edge 41 and the second cutting edge 42. In top view, the third cutting edge 43 is at a corner of the substantially polygonal shape. The first cutting edge 41 functions as a main cutting edge. The second cutting edge 42 functions as a flat cutting edge. The third cutting edge 43 functions as a corner cutting edge. The third cutting edge 43 connects the first cutting edge 41 and the second cutting edge 42. To be specific, one end of the third cutting edge 43 is connected to the first cutting edge 41, and the other end of the third cutting edge 43 is connected to the second cutting edge 42.

Figures 2A, 2B:
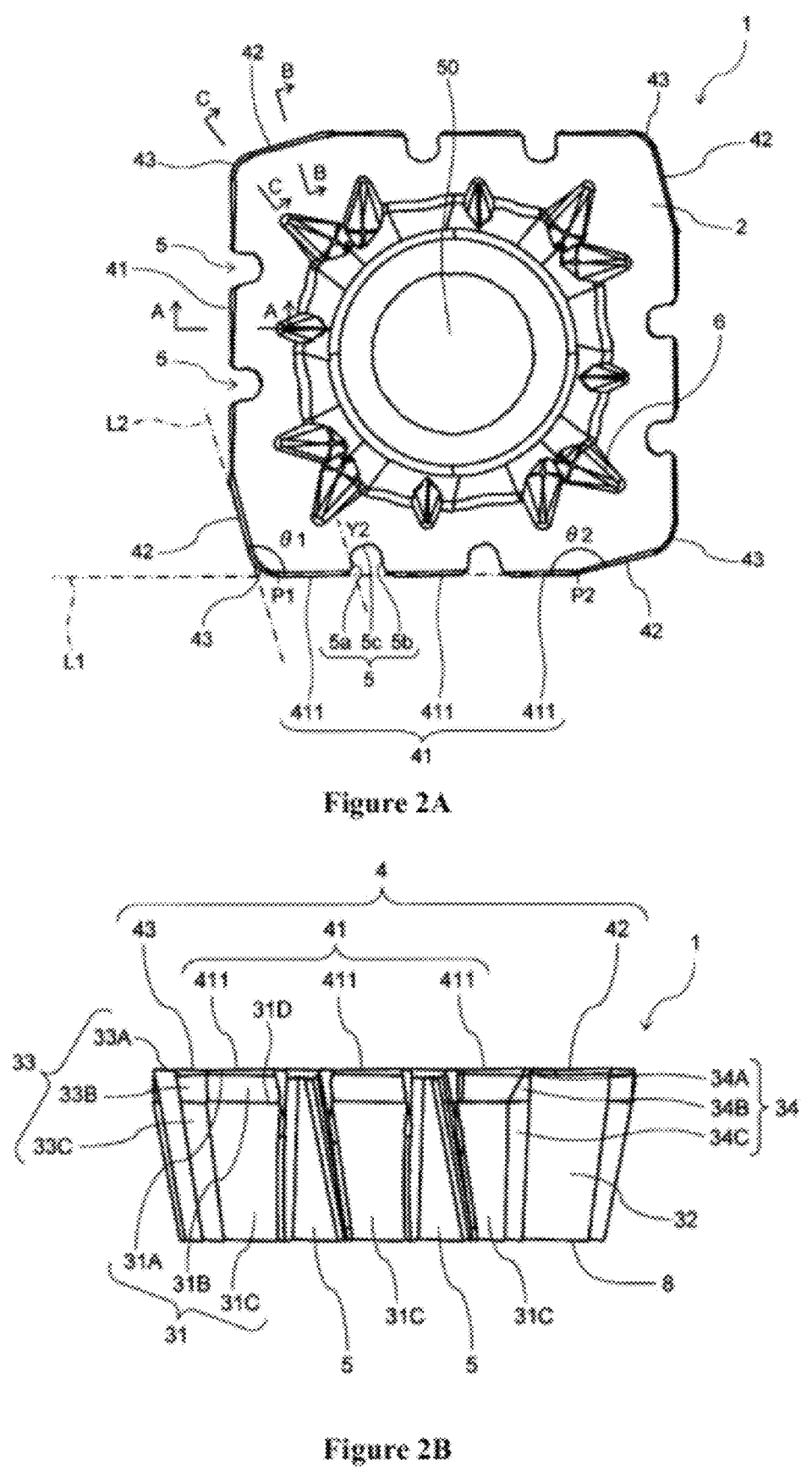

The upper surface has a substantially polygonal shape as described above. To be specific, the upper surface has a substantially square shape. A through-hole 50 extends through the body 7 from the center of the upper surface to the lower surface 8. A fixing screw 51 is to be inserted into the through-hole 50 so as to fix the insert 1 to a holder 11 described below. The insert 1 has rotational symmetry of 90 degrees around the central axis of the through-hole 50. Thus, as illustrated in FIG. 2(a), in top view, four cutting edges 4 are disposed on the insert 1 such that the third cutting edge 43 is at each of the four corners of the substantially square shape. That is, the insert 1 comprises four first cutting edges 41, four second cutting edges 42, and four third cutting edges 43.

As illustrated in FIG. 2(a), the first cutting edge 41 and the second cutting edge 42 are disposed at an obtuse angle in top view. In top view, the first cutting edge 41 and the second cutting edge 42 are disposed at an obtuse angle in the sense that the angle θ1 between an imaginary extension line L1 of the first cutting edge 41 and an imaginary extension line L2 of the second cutting edge 42 is an obtuse angle. The imaginary extension line L1 of the first cutting edge 41 refers to an extension of a line connecting one end P1 and the other end P2 of the first cutting edge 41 toward the third cutting edge 43 connected thereto. The imaginary extension line L2 of the second cutting edge 42 is defined in a manner similar to the imaginary extension line L1 of the first cutting edge 41.

That is, in the embodiment, the first cutting edge 41 and the second cutting edge 42 are formed such that the angle θ1 between the imaginary extension line L1 and the imaginary extension line L2 is an obtuse angle. It is preferable that the angle θ1 be 90 to 135 degrees. The angle between the imaginary extension line L1 and the first cutting edge 41 of an adjacent cutting edge 4 is substantially 90 degrees.

The first cutting edge 41 is disposed so as to be connected to the second cutting edge 42 of an adjacent cutting edge 4 such that an angle θ2 between the first cutting edge 41 and the second cutting edge 42 is an obtuse angle. Thus, the first cutting edge 41 having a high strength and the second cutting edge 42 having a low cutting resistance can be maximally elongated. Therefore, stable cutting is possible under a severer cutting condition with a large cutting depth or a high feed rate. It is preferable that the angle θ2 be in the range of 135 to 179 degrees.

As illustrated in FIG. 1, the flank 3 of the insert 1 comprises a first flank 31 corresponding to the first cutting edge 41, a second flank 32 corresponding to the second cutting edge 42, and a third flank 33 corresponding to the third cutting edge 43. In the embodiment, among the three flanks (31, 32, 33), the first flank 31 comprises three surfaces that satisfy the following inequality among the clearance angles.

That is, as illustrated in FIG. 2(b), the first flank 31 comprises an upper flank 31A, a middle flank 31B, and a lower flank 31C. The upper flank 31A is connected to the first cutting edge 41. The middle flank 31B is on the lower surface 8 side of the upper flank 31A. The clearance angle of the middle flank 31B is larger than that of the upper flank 31A. The lower flank 31C is on the lower surface 8 side of the middle flank 31B. The clearance angle of the lower flank 31C is larger than that of the middle flank 31B.

Figure 3A:
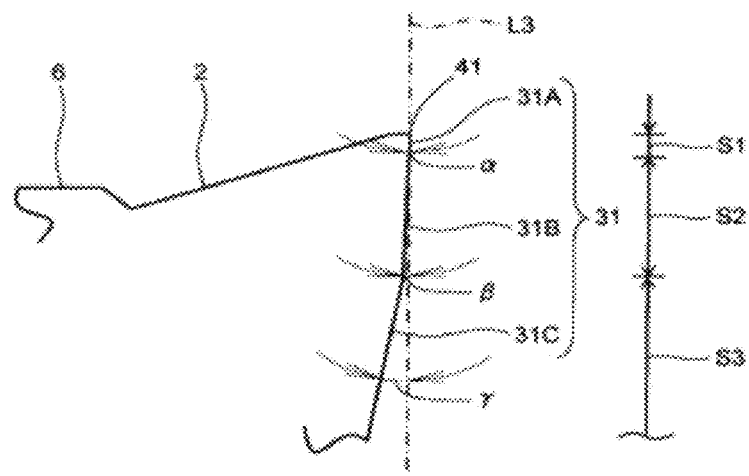
FIG. 3(a) is a sectional view taken along line A-A in FIG. 2(a)

That is, as illustrated in FIG. 3(a), the first flank 31 comprises three surfaces (upper flank 31A, middle flank 31B, lower flank 31C) that satisfy an inequality $\alpha < \beta < \gamma$ between the clearance angles, where $\alpha$ is the clearance angle of the upper flank 31A, $\beta$ is the clearance angle of the middle flank 31B, and $\gamma$ is the clearance angle of the lower flank 31C, the clearance angles being in an arbitrary section substantially perpendicular to the first cutting edge 41 and the lower surface 8.

The clearance angle of each of the flanks refers to an angle between the flank and a line L3 that is substantially perpendicular to the lower surface 8 and intersects the first cutting edge 41. It is preferable that the clearance angle $\alpha$ be in the range of 0 to 1 degrees, the clearance angle $\beta$ be in the range of 2 to 4 degrees, and clearance angle $\gamma$ be in the range of 10 to 12 degrees. The lower surface 8 side of the upper flank 31A may be connected to the middle flank 31B through a rounded surface. The middle flank 31B may be connected to the lower flank 31C in a similar manner.

Figure 3B:
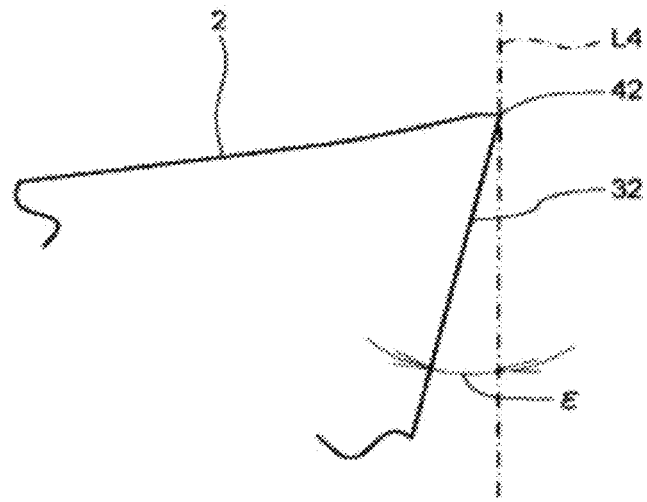
FIG. 3(b) is a sectional view taken along line B-B in FIG. 2(a)

Moreover, in the embodiment, as illustrated in FIG. 3(b), the second flank 32 is configured such that an inequality $\alpha < \beta < \gamma < \epsilon$ is satisfied among the clearance angles of the first flank 31 and the second flank 32, where $\epsilon$ is the clearance angle of the second flank 32. The clearance angle of the second flank 32 refers to an angle between the second flank 32 and a line L4 that is substantially perpendicular to the lower surface 8 and intersects the second cutting edge 42. It is preferable that the clearance angle $\epsilon$ be in the range of 13 to 15 degrees.

The three surfaces of the first flank 31, in the order from the upper surface side of the body 7 in the thickness direction, respectively have the following functions.

First, the upper flank 31A, which is in the uppermost position among the three surfaces, is connected to the first cutting edge 41. The upper flank 31A has the smallest clearance angle so that, when the insert 1 bites into a work material during cutting, the upper flank 31A may have surface contact rather than line contact with the work material. The upper flank 31A serves to reduce chatter vibration during cutting.

Second, the middle flank 31B, which is on the lower surface 8 side of the upper flank 31A, has a clearance angle larger than that of the upper flank 31A, so that an unwanted increase in cutting load is reduced and the strength of the first cutting edge 41 is improved. That is, the clearance angle of the middle flank 31B can be set such that an actual clearance angle when the insert 1 is mounted on the holder 11 is made as small as possible as described below.

Third, the lower flank 31C, which is on the lower surface 8 side of the middle flank 31B and nearest to the lower surface 8 among the three surfaces, has the largest clearance angle among the three surfaces. Thus, interference with a work material can be reduced.

Since the first flank 31 comprises the flanks respectively having the clearance angles $\alpha$, $\beta$, and $\gamma$, local concentration of stress on intersections of the flanks of the first flank 31 can be reduced, without using a configuration in which a part of a flank corresponding to the first cutting edge 41 protrudes outside the body 7. Moreover, since the second flank 32, which is connected to the second cutting edge 42 and functions as a flat cutting edge, has the clearance angle $\epsilon$ that is larger than the clearance angles $\alpha$, $\beta$, $\gamma$ of the first flank 31, cutting resistance to the second cutting edge 42 can be reduced and precision of a finished surface is improved. As a result, the insert 1 reduces generation of cracks in a part of the flank 3 and occurrence of a fracture of the cutting edge 4 due to concentration of stress and provides good machining accuracy. Therefore, a long tool life and a good cutting performance can be provided.

In the embodiment, the clearance angles $\alpha$, $\beta$, and $\gamma$ of the upper flank 31A, the middle flank 31B, and the lower flank 31C, respectively, are constant. With this configuration, the strength of the first cutting edge 41 can be improved over the entire length thereof, and a fracture of the cutting edge due to reduction of strength of a part of the first cutting edge 41 can be decreased. The clearance angles are constant in the sense that the clearance angles are constant in the width direction of the body 7, which is a direction perpendicular to the thickness direction. It is sufficient that the clearance angles be substantially constant. That is, the clearance angle may have a certain value ±2 degrees.

The clearance angle $\epsilon$ of the second flank 32 is constant. Thus, cutting resistance is reduced over the entire length of the second cutting edge 42, so that precision of a finished surface is further improved. Moreover, since the second cutting edge 42 has the large clearance angle $\epsilon$ over the entire length thereof, interference with a work material during cutting is effectively reduced, so that precision of a finished surface is further improved.

It is preferable that the clearance angle $\alpha$ of the upper flank 31A of the first flank 31 be 0 degrees. Thus, chatter vibration during cutting can be reduced. Moreover, biting into a work material can be improved. The upper flank 31A, which has the clearance angle $\alpha$ of 0 degrees, may have a dimension in the thickness direction that is necessary to change line contact into surface contact. It is preferable that the dimension S1 of the upper flank 31A in the thickness direction be in the range of 0.1 to 0.2 mm.

As illustrated in FIGS. 2(b) and 3(a), when the clearance angle $\alpha$ of the upper flank 31A is 0 degrees, in side view, a dimension S1 of the upper flank 31A in the thickness direction and a dimension S2 of the middle flank 31B in the thickness direction are made constant. The dimensions of the flanks in the thickness direction are constant in the sense that the dimensions of the flanks are constant in the width direction of the body 7, that is, in a direction perpendicular to the thickness direction. Moreover, the dimension S1 of the upper flank 31A in the thickness direction is made smaller than the dimension S2 of the middle flank 31B in the thickness direction. That is, an inequality S1<S2 is satisfied, where S1 and S2 are the dimensions described above. Thus, cutting load can be reduced, and interference with work material and chatter vibration can be reduced. As a result, machining accuracy can be improved.

That is, by providing the upper flank 31A connected to the first cutting edge 41 with a dimension in the thickness direction smaller than that of the middle flank 31B and a clearance angle of 0 degrees, the insert 1 can make surface contact with a work material when the insert 1 starts cutting. Therefore, excessive biting of the first cutting edge 41 into the work material can be decreased, whereby chatter vibration during cutting can be decreased. Moreover, by providing the middle flank 31B, which is on the lower surface 8 side of the upper flank 31A, with a dimension in the thickness direction larger than that of the upper flank 31A and a clearance angle larger than 0 degrees, the strength of the first cutting edge 41 is effectively improved.

In side view, a dimension S3 of the lower flank 31C of the first flank 31 in the thickness direction is larger than the distance between an upper end of the upper flank 31A and a lower end of the middle flank 31B in the thickness direction. That is, the dimension S3 of the lower flank C in the thickness direction is larger than the sum of the dimension S1 of the upper flank 31A and the dimension S2 of the middle flank 31B in the thickness direction. In other words, the dimensions S1 to S3 satisfy an inequality S3>(S1+S2). Thus, the upper flank 31A, which functions to decrease chatter vibration during cutting, and the middle flank 31B, which functions to improve the strength, have predetermined widths. The lower flank 31C, which functions to reduce interference with a work material as described above, has the largest dimension in the first flank 31. Thus, interference with the work material is effectively reduced, and precision of a finished surface is further improved. Since the insert 1 comprises the upper flank 31A, the middle flank 31B, and the lower flank 31C, the insert 1 can show good cutting performance. In addition, the lower flank 31C functions as a clamping surface against the holder 11, so that the constraint surface having a large area can be provided. Therefore, the clamping force with the holder 11 is increased, whereby the insert 1 can be stably fixed to the holder 11.

The second flank 32 comprises a single surface. Since the second flank has such a simple shape, generation of cracks is reduced and the insert 1 can be easy to manufacture, which leads to cost efficiency. Moreover, the second cutting edge 42 can have good sharpness over the entire length thereof, and interference with a work material is more effectively reduced.

The clearance angle of the third flank 33 increases in the direction from the first flank 31 to the second flank 32. Thus, the cutting edges comprise the first cutting edge 41, which has good strength, and the second cutting edge 42, which has good sharpness and a low cutting resistance. Moreover, the third cutting edge 43, which is a corner cutting edge, can be provided with good characteristics. That is, by making the clearance angle of the third flank 33 be a predetermined angle as described above, strength of the first cutting edge 41 can be improved and cutting resistance of the second cutting edge 42 can be reduced.

Figure 3C:
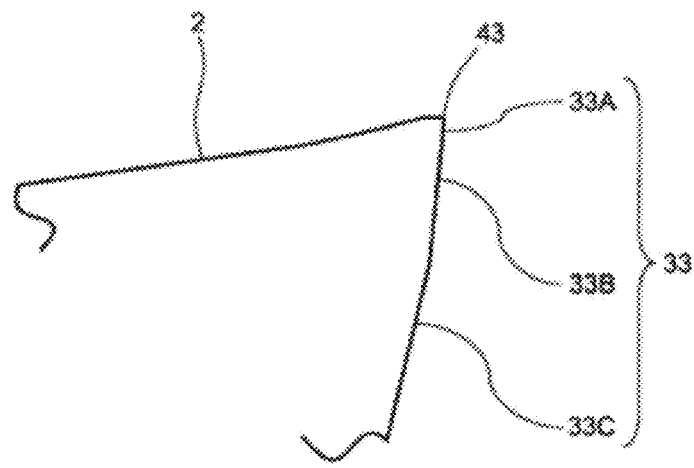
FIG. 3(c) is a sectional view taken along line C-C in FIG. 2(a).

As illustrated in FIGS. 2(b) and 3(c), the third flank 33 comprises three surfaces (33A, 33B, 33C) arranged in the thickness direction such that the three surfaces respectively correspond to the upper flank 31A, the middle flank 31B, and the lower flank 31C of the first flank 31. The three surfaces of the third flank 33 are configured such that the clearance angle of a surface 33A on the upper surface side is smaller than the clearance angle of a surface 33C on the lower surface 8 side, and, in side view, the dimension of each of the surfaces in the thickness direction is constant.

Thus, the third flank 33, which is connected to the third cutting edge 43 at a corner, comprises, in the order from the upper surface side, the surface 33A that functions to decrease chatter vibration during cutting, the surface 33B that functions to improve the strength, and the surface 33C that functions to reduce interference with a work material. Therefore, not only the first cutting edge 41 but also the third cutting edge 43 at a corner serves to reduce chatter vibration during cutting, improve the strength, and reduce interference with a work material.

The three surfaces (33A, 33B, 33C) of the third flank 33 correspond to the flanks (31A, 31B, 31C) of the first flank 31, respectively. Thus, at a connection portion of the first flank 31 and the second flank 32, the number of boundary points, at which a fracture may occur, can be reduced to the minimum, whereby occurrence of a fracture due to a crack can be reduced.

In an existing insert, a first flank corresponding to a first cutting edge is connected to a second flank corresponding to a second cutting edge, so that the largest clearance angle of the first flank is the same as the clearance angle of the second flank. Therefore, the clearance angle of the second flank, which corresponds to the second cutting edge that functions as a flat cutting edge, is limited in view of the strength of the first cutting edge, thereby limiting improvement of machining accuracy.

In the embodiment, the flank 3 comprises a fourth flank 34 between the first flank 31, which corresponds to the first cutting edge 41 of the cutting edge 4, and the second flank 32, which corresponds to the second cutting edge 42 of the cutting edge 4. The clearance angle of the fourth flank 34 increases in the direction from the first flank 31 to the second flank 32. Thus, the fourth flank 34 serving as a transition surface is disposed between the first flank 31 having a small clearance angle and the second flank 32 having a large clearance angle, and the clearance angle of the fourth flank 34 increases with decreasing distance from the second flank 32. Therefore, the strength of the first cutting edge 41 can be increased over the entire length thereof and machining accuracy of the second cutting edge 42 can be improved over the entire length thereof.

As illustrated in FIG. 2(b), in side view, the dimension of the fourth flank 34 in the width direction, that is, the dimension in a direction perpendicular to the thickness direction, is smallest on the upper surface side. Thus, the dimension of the fourth flank 34, on which the clearance angle gradually and considerably changes along the cutting edge 4, in a direction perpendicular to the thickness direction is smallest on the upper surface side. Therefore, the influence on the strength of the first cutting edge 41, which is subjected to a heavy load during cutting, and the influence on the sharpness of the second cutting edge 42 can be reduced. That is, the first cutting edge 41 having a good strength and the second cutting edge 42 having a low cutting resistance can coexist over the entire length of the first cutting edge 4.

The fourth flank 34 comprises three surfaces (34A, 34B, 34C), which correspond to the upper flank 31A, the middle flank 31B, and the lower flank 31C of the first flank 31, respectively. Thus, at a connection portion of the fourth flank 34 and the first flank 31 and in a connection portion of the fourth flank 34 and the second flank 32, the number of boundary points, at which a fracture may occur, can be reduced, whereby occurrence of a fracture of the cutting edge due to a crack generated at the boundary points can be reduced.

The body 7 comprises grooves 5 in the first flank 31, the grooves 5 extending in the thickness direction. The grooves 5 comprise ends in the rake face 2 and divide the first cutting edge 41. In the embodiment, two grooves 5 are formed in the first flank 31 corresponding to the first cutting edge 41. Therefore, the first cutting edge 41 is divided into three cutting edge portions (411, 411, 411).

Thus, the three cutting edge portions of the first cutting edge 41 have clearance angles that satisfy the above-described inequality and have short lengths. Therefore, each of the cutting edge portions has good strength over the entire length thereof, and cutting resistance during cutting is reduced. As a result, under a severe cutting condition such as a high feed rate, the insert 1 can show good cutting performance.

Figure 4:
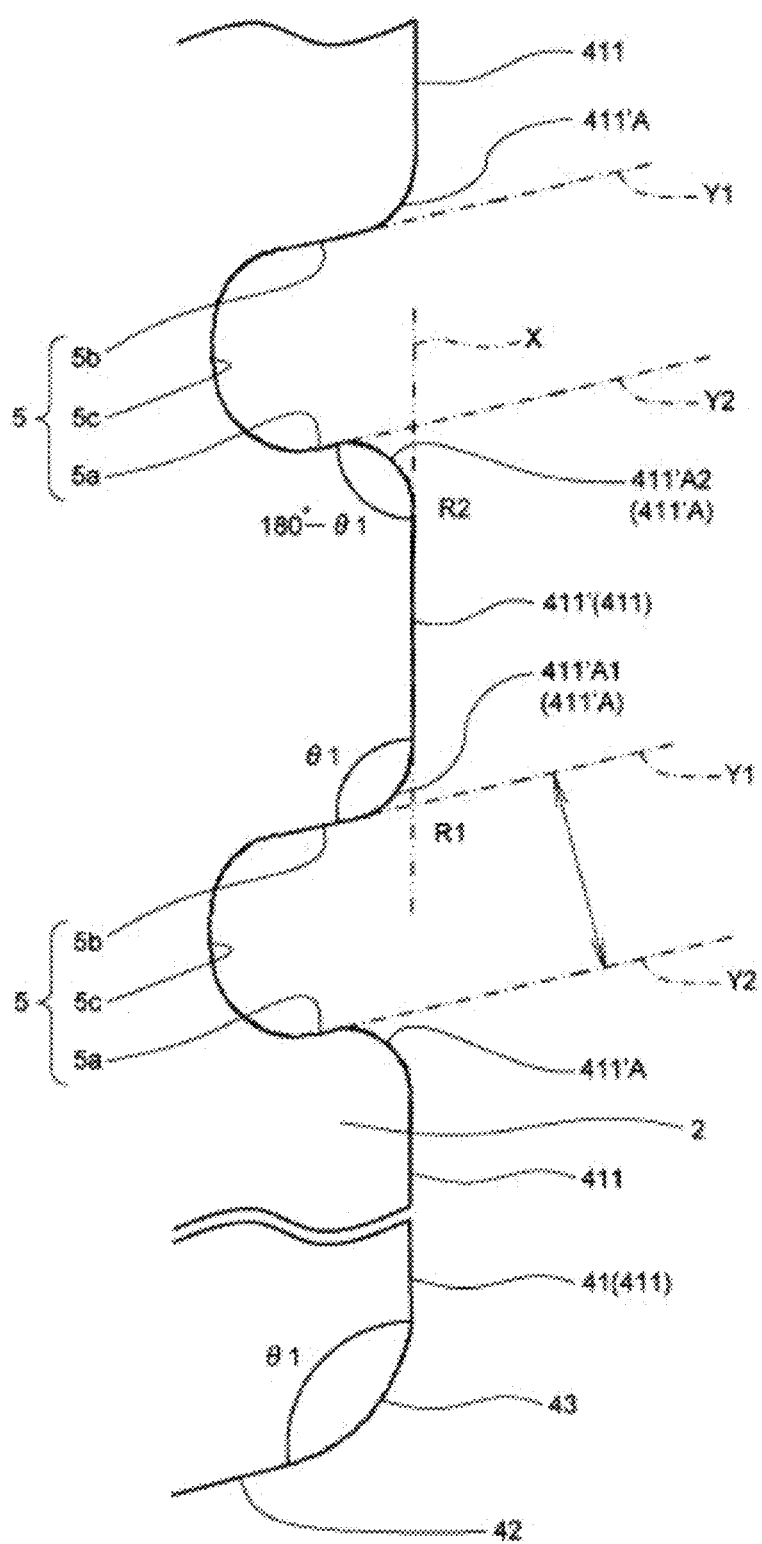
FIG. 4 is an enlarged view of the cutting insert shown in FIG. 2(a), illustrating a portion surrounding grooves.

As illustrated in FIGS. 1, 2(a), and 4, each of the grooves 5 extends, in top view, from the flank 3 toward the inside of the body 7. The groove 5 comprises the side wall surfaces 5a and 5b facing each other and a bottom surface 5c between the side wall surfaces 5a and 5b. The side wall surfaces 5a and 5b and the bottom surface 5c extend in the thickness direction of the insert 1.

Between the side wall surfaces 5a and 5b, the side wall surface 5a on the third cutting edge 43 side is substantially parallel to the second cutting edge 42 in top view. With this configuration, even if the insert 1 is of a type mounted on the holder 11 with a peripheral cutting edge angle, interference between a non-cutting portion and the insert 1 can be reduced. Thus, a chip can be divided in the width direction so that cutting resistance can be reduced, whereby precision of a finished surface is more effectively improved. In addition, chips are generated with small thicknesses and widths, whereby the chip removal property can be improved.

The side wall surface 5a of the groove 5 is substantially parallel to the second cutting edge 42 in the sense that they are practically parallel to each other. That is, in accordance with the size of the insert 1, the side wall surface 5a of the groove 5 may be inclined with respect to the second cutting edge 42 by 0 to 2 degrees. Even in this case, an advantage similar to that described above can be gained.

To be more specific, in top view, the side wall surface 5a of the groove 5 is substantially parallel to the second cutting edge 42 in the sense that, as illustrated in FIG. 4, an imaginary extension line Y2 of a straight line portion of the intersection of the rake face 2 and the side wall surface 5a of the groove 5 is substantially parallel to the second cutting edge 42. The imaginary extension line Y2 is substantially parallel to the second cutting edge 42 in the sense that they are practically parallel to each other. That is, the imaginary extension line Y2 may be inclined with respect to the second cutting edge 42 by 0 to 2 degrees. If the side wall surface 5a is curved, in top view, a tangent line at a connection point of the side wall surface 5a and the curved cutting edge 411'A at an end of the cutting edge portion 411 may be used as the imaginary extension line Y2.

The side wall surface 5b, which faces the side wall surface 5a, is substantially parallel to the second cutting edge 42 in top view. That is, in the embodiment, the side wall surface 5a and 5b are substantially parallel to each other. Thus, the strength of the body 7 is increased.

The side wall surface 5b is substantially parallel to the second cutting edge 42 in top view in the sense that an imaginary extension line Y1 of a straight line portion of the intersection of the side wall surface 5b and the rake face 2 is substantially parallel to the second cutting edge 42. The imaginary straight line Y1 is substantially parallel to the second cutting edge 42 in the sense that they are practically parallel to each other. That is, the imaginary straight line Y1 may be inclined with respect to the second cutting edge 42 by 0 to 2 degrees. Other configurations are similar to the case of the side wall surface 5a and the second cutting edge 42, which are substantially parallel to each other as described above.

Side wall surfaces of the grooves 5, which divide the first cutting edge 41, are substantially parallel to one another. Thus, the direction in which chips are removed can be stabilized. Therefore, the chip removal property can be improved. The side wall surfaces of the grooves 5 are substantially parallel to one another in the sense that the side wall surfaces 5a of the grooves 5 are substantially parallel to one another and the side wall surfaces 5b of the grooves 5 are substantially parallel to one another. The side wall surface 5a of one of the grooves 5 may be inclined with respect to the side wall surface 5a of the other of the grooves 5 by 0 to 2 degrees, and the side wall surface 5b of one of the grooves 5 may be inclined with respect to the side wall surface 5b of the other of the grooves 5 by 0 to 2 degrees.

As illustrated in FIG. 4, in top view, among the three cutting edge portions 411 of the first cutting edge 41, a cutting edge portion 411' comprising two ends each connected to one of the grooves 5 comprises curved cutting edges 411'A at the ends. With this configuration, a high stress acting on the ends of the cutting edge portion 411' can be dispersed. That is, the strength of the ends of the cutting edge portion 411' can be increased. Therefore, occurrence of a fracture of the cutting edge can be reduced.

Two curved cutting edges 411'A of the cutting edge portion 411' have arch shapes in top view. Thus, stress can be dispersed more effectively.

If the two curved cutting edges 411'A have arch shapes in top view, it is preferable that the following inequality be satisfied. That is, if a curved cutting edge 411'A1 is one of the two curved cutting edges 411'A that is on the third cutting edge 43 side and a curved cutting edge 411'A2 is the other of the two curved cutting edges 411'A, it is preferable that a radius of curvature R1 of the curved cutting edge 411'A1 be larger than a radius of curvature R2 of the curved cutting edge 411'A2. That is, it is preferable that the radius of curvatures R1 and R2 satisfy an inequality R1>R2.

Thus, at both ends of the cutting edge portions 411', contact lengths between the cutting edge and a work material become the same, whereby the direction in which generated chips are removed can be stabilized. A more detailed reason is described below.

As described above, the groove 5 comprises the side wall surfaces 5a and 5b, which are substantially parallel to the second cutting edge 42. Therefore, in the groove 5, the angles between the first cutting edge 41 and the side wall surfaces 5a and 5b of the groove 5 at the ends of the cutting edge portion 411' are different from each other, the first cutting edge 41 being at an obtuse angle with respect to the second cutting edge 42. That is, as illustrated in FIG. 4, one end of the cutting edge portion 411' adjacent to the third cutting edge 43 is connected to the side wall surface 5b of the groove 5 at an obtuse angle. On the other hand, the other end of the cutting edge portion 411' is connected to the side wall surface 5a of the groove 5 at an acute angle.

To be specific, when the first cutting edge 41 and the second cutting edge 42 are at an angle $\theta 1$ (obtuse angle), the cutting edge portion 411' is at the angle $\theta 1$ (obtuse angle) with respect to the side wall surface 5b of the groove 5, at one end of the cutting edge portion 411' adjacent to the third cutting edge 43. On the other hand, the cutting edge portion 411' is at an angle $180-\theta 1$ (acute angle) with respect to the side wall surface 5a of the groove 5, at the other end of the cutting edge portion 411'.

As illustrated in FIG. 4, the angles between the cutting edge portion 411' and the side wall surfaces 5a and 5b of the groove 5 refer to the angles between an imaginary extension line X of a linear portion of the cutting edge portion 411' and the imaginary extension lines Y1 and Y2.

Thus, in the embodiment, the cutting edge portion 411' has different angles (an acute angle and an obtuse angle) with respect to the side wall surfaces 5a and 5b of the groove 5 at the ends of the cutting edge portion 411'. Therefore, in the embodiment, the cutting edge portion 411' and the side wall surfaces 5a and 5b of the groove 5, having such angles with respect to each other, are connected to each other through the curved cutting edges 411'A1 and 411'A2 having the radius of curvature R1 and R2, respectively. That is, the cutting edge portion 411' satisfies R1>R2.

Therefore, as compared with a case when the cutting edge portion 411' comprises arch shaped portions having the same radius of curvature R, by providing a larger radius of curvature R to the curved cutting edge 411'A1 at an end at which the angle against the groove 5 is large (obtuse angle), the contact length between a chip and the cutting edge during cutting is made larger. On the other hand, by providing a small radius of curvature R to the curved cutting edge 411'A2 at an end at which the angle against the groove 5 is small (acute angle), the contact length with a chip during cutting is made smaller.

With this configuration, at the ends of the cutting edge portion 411' at which the cutting edge portion 411' have different angles against the groove 5, the contact length with a chip during cutting can be equalized. Therefore, cutting loads on the ends of the cutting edge portion 411' can be equalized. Moreover, the direction in which chips are removed from the ends of the cutting edge portion 411' becomes stable, whereby the chip removal property can be improved.

In addition, by making a radius of curvature R1 of the curved cutting edge 411'A1 adjacent to the third cutting edge 43 be larger, the strength of the curved cutting edge 411'A1 adjacent to the third cutting edge 43, to which a heavy cutting load is applied, can be increased. Therefore, occurrence of a fracture in the cutting edge can be reduced, whereby the tool life can be extended.

The groove 5 comprises the other end in the lower surface 8. That is, the groove 5 extends in the first flank 31 from the rake face 2 to the lower surface 8. As illustrated in FIG. 2(b), the width of the groove 5 increases in the direction from a boundary 31D, which is between the middle flank 31B and the lower flank 31C of the first flank 31, to the lower surface 8. Thus, over the entire thickness of the insert 1, interference between the non-cutting portion and the insert 1 can be reduced. Therefore, occurrence of a breakage of the insert 1 can be decreased. The widths of the groove 5 respectively refer to the maximum dimensions of the groove 5 at the boundary 31D and at the lower surface 8 in a direction parallel to the first flank 31.

As illustrated in FIGS. 1 and 2(a), protrusions 6, which function as breakers, are formed in the rake face 2 so as to improve the chip removal property. The numbers and shapes of the protrusions 6 can be appropriately selected. In the present embodiment, in which the first cutting edge 41 is divided by the grooves 5, it is preferable that each of the protrusions 6 corresponds to a divided portion of the cutting edge. Thus, chips generated by the divided portions of the cutting edge can be made to contact corresponding one of the protrusions 6, so that chips can be curled stably. Therefore, a high chip removal property can be achieved. Moreover, the protrusions 6 are also disposed so as to correspond to the second cutting edge 42 and the third cutting edge 43. As a result, the chip removal property can be more effectively improved.

<Cutting Tool>

Figure 5:
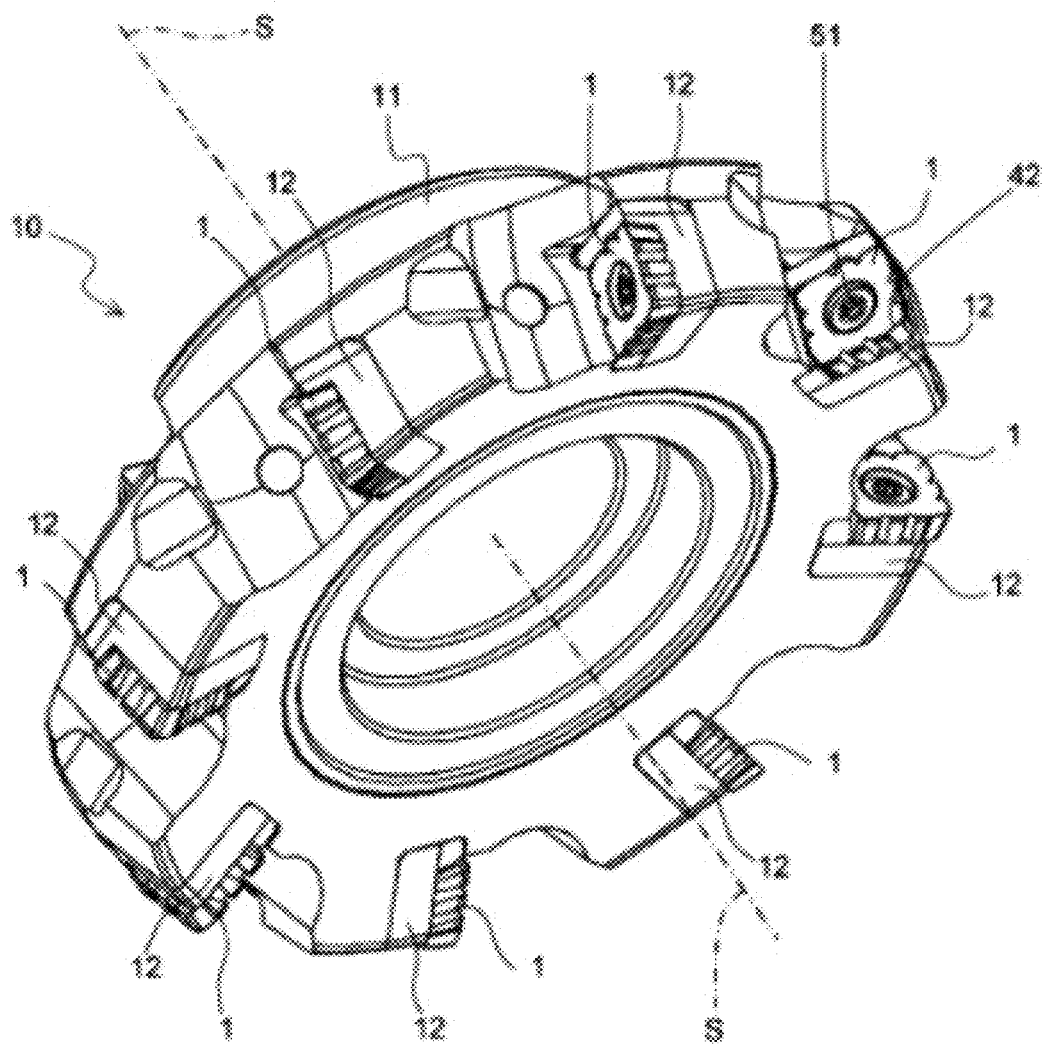
FIG. 5 is a perspective view of a cutting tool according to an embodiment of the present invention.

Referring to FIG. 5, a cutting tool according to an embodiment of the present invention is described. As illustrated in the figure, a cutting tool 10 of the embodiment comprises the holder 11 and the inserts 1 mounted on tips of the holder 11. Each of the inserts 1 is mounted on a tip of the holder 11 by inserting the fixing screw 51 into the through-hole 50 of the insert 1 and by screwing a tip of the fixing screw 51 into a screw hole (not shown) formed in a seat portion of the holder 11 for mounting the insert 1 thereon.

In the embodiment, eight inserts 1 are mounted on the holder 11. When the insert 1 is mounted, the second cutting edge 42 is substantially perpendicular to the axis S of the holder 11. Since the cutting tool 10 has this construction, generation of a crack in the flank 3, and occurrence of a fracture of the cutting edge 4 due to the crack can be reduced. Moreover, since the cutting tool 10 comprises the inserts 1 each having a strong first cutting edge and a sharp second cutting edge 42 functioning as a flat cutting edge, the tool life is extended so that machining efficiency can be improved and cutting that provides a high-precision finished surface can be performed. The second cutting edge 42 is substantially perpendicular to the axis S of the holder 11 in the sense that they are practically perpendicular to each other. That is, the angle between the second cutting edge 42 and the axis S may be 90±2 degrees.

A sheet member 12 is disposed between the insert 1 and the holder 11. With this construction, the holder 11 is protected from being damaged when the insert 1 breaks. Therefore, the life of the holder 11 can be extended. That is, cutting performance can be improved by replacing the sheet member 12 having a small volume instead of replacing the holder 11 having a large volume. Therefore, cutting efficiency can be improved and machining cost can be reduced.

<Cutting Method>

Figure 6A:
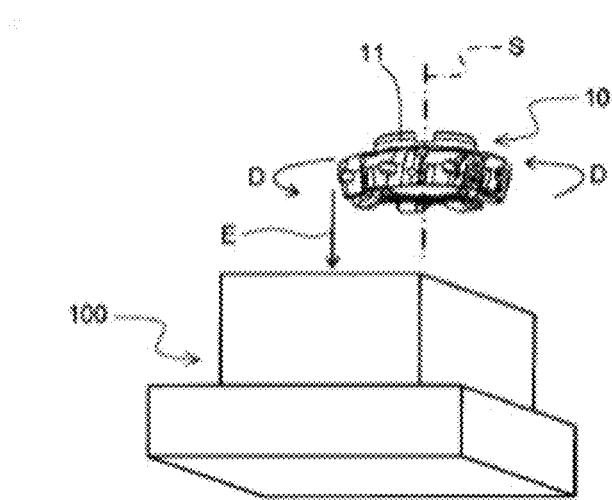
FIGS. 6(a) to 6(c) are explanatory schematic views illustrating a cutting method according to an embodiment of the present invention.
Figure 6B:
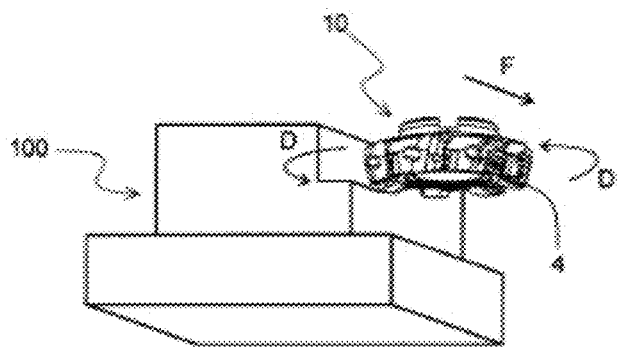
Figure 6C:
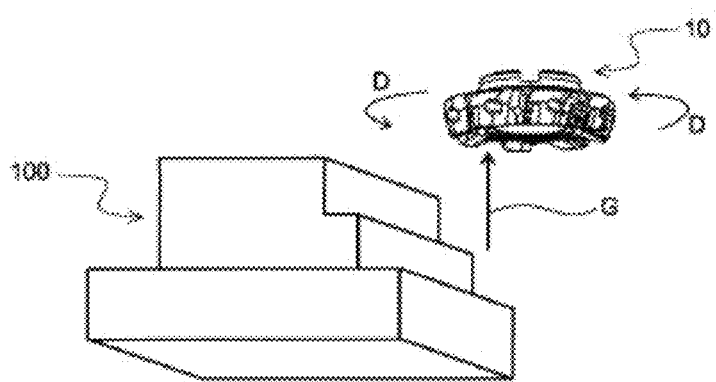

Referring to FIGS. 6(a) to 6(c), a cutting method according to an embodiment of the present invention is described. According to the embodiment, a method of cutting a work material comprises the following steps (i) to (iii):

(i) rotating the cutting tool 10 around the axis S of the holder 11 in the direction of arrow D, moving the cutting tool 10 in the direction of arrow E, and bringing the cutting tool 10 close to a work material 100, as illustrated in FIG. 6(a);

(ii) making the cutting edge 4 of the insert 1 contact a surface of the work material 100, moving the cutting tool 10 in the direction of arrow E, and cutting the work material 100, as illustrated in FIG. 6(b); and (iii) moving the cutting tool 10 in the direction of arrow G and separating the cutting tool 10 from the work material 100, as illustrated in FIG. 6(c).

With these steps, by using a cutting tool having a strong cutting edge and being capable of providing a high-precision finished surface, cutting can be performed efficiently and precisely.

In the step (i), at least one of the cutting tool 10 and the work material 100 may be rotated. The cutting tool 10 and the work material 100 may be brought close relative to each other. For example, the work material 100 may be moved close to the cutting tool 10. Likewise, in the step (iii), the work material 100 and the cutting tool 10 may be separated relatively from each other. For example, the work material 100 may be moved away from the cutting tool 10. To continue cutting, while the cutting tool 10 and/or the work material 100 is being rotated, the step of making the cutting edge 4 of the insert 1 contact a different part of the work material 100 may be repeated. When a cutting edge is worn out during use, an unused cutting edge may be used by rotating the insert 1 by 90 degrees around the central axis of the through-hole 50.

Heretofore, preferred embodiments of the present invention have been described as examples. However, the present invention is not limited to the embodiments. For example, the insert illustrated in the embodiments comprises an upper surface having a substantially square shape with four corners in top view. However, the present invention is not limited thereto, and the upper surface may have a different shape such as a rhombus or a triangle in top view.

It is not necessary that the third cutting edges 43 be formed in all corners of the substantially polygonal shape as in the embodiments. That is, the third cutting edges 43 may be formed in two opposite corners of an upper surface having a substantially square shape in top view.

In the embodiments, the insert comprises the grooves 5 and the protrusions 6. However, the present invention is not limited thereto, and the insert may comprise either of the grooves 5 and the protrusions 6, or none of these.

In the embodiments, the clearance angles $\alpha$, $\beta$, and $\gamma$ of the three flanks of the first flank 31 are respectively constant. However, the present invention is not limited thereto, and the clearance angles of some or all of the flanks may be configured to gradually increase or decrease.

In the embodiments, the side wall surface 5a of the groove 5 on the third cutting edge 43 side is, in top view, substantially parallel to the second cutting edge 42. However, the side wall surface 5a may become closer to the second cutting edge 42 toward the inside of the groove. The side wall surface 5a becomes closer to the second cutting edge 42 in the sense that the distance between the side wall surface 5a and the second cutting edge 42 on the bottom surface 5c side is smaller than the distance between the side wall surface 5a and the second cutting edge 42 on the opening side of the groove. As long as the strength of the insert is not reduced, the distance between the second cutting edge 42 and the side wall surface 5a on the bottom surface 5c side can be appropriately set.

In the embodiments, the side wall surface 5b facing the side wall surface 5a is, in top view, substantially parallel to the second cutting edge 42. However, the side wall surface 5b may become farther from the second cutting edge 42 toward the inside of the groove. The side wall surface 5b becomes farther from the second cutting edge 42 in the sense that the distance between the side wall surface 5b and the second cutting edge 42 on the bottom surface 5c side is larger than the distance between the side wall surface 5b and the second cutting edge 42 on the opening side of the groove.

In the embodiments, the number of the grooves is two. However, in order to keep the strength and reduce the cutting resistance of the insert, in a normal case, the number of the grooves can be appropriately set in the range of two to six, and preferably in the range of two to four.

The invention claimed is:

1. A cutting insert comprising:
an insert main body with an upper surface comprising a corner, a lower surface, and a side surface comprising a flank, the insert main body comprising a cutting edge at an intersection of the upper surface and the side surface;
wherein the cutting edge comprises a first cutting edge, a second cutting edge, and a third cutting edge, the third cutting edge between the first cutting edge and the second cutting edge being at the corner in top view,
wherein the flank comprises a first flank corresponding to the first cutting edge, a second flank corresponding to the second cutting edge, and a third flank corresponding to the third cutting edge, wherein the first flank comprises an upper flank connected to the first cutting edge, a middle flank on the lower surface side of the upper flank, and a lower flank on the lower surface side of the middle flank, and wherein an inequality $\alpha<\beta<\gamma<\epsilon$ is satisfied, where $\alpha$ is a clearance angle of the upper flank, $\beta$ is a clearance angle of the middle flank, $\gamma$ is a clearance angle of the lower flank, and $\epsilon$ is a clearance angle of the second flank.

2. The cutting insert according to claim 1, wherein the clearance angle of the second flank is constant.

3. The cutting insert according to claim 1,
wherein the clearance angle of the upper flank of the first flank is 0 degrees,
wherein, in side view, a dimension of the upper flank of the first flank in the thickness direction and a dimension of the middle flank of the first flank in the thickness direction are respectively constant, and
wherein the dimension of the upper flank of the first flank in the thickness direction is smaller than the dimension of the middle flank of the first flank in the thickness direction.

4. The cutting insert according to claim 1, wherein, in side view, a dimension of the lower flank of the first flank in the thickness direction is larger than a distance between an upper end of the upper flank of the first flank and a lower end of the middle flank of the first flank in the thickness direction.

5. The cutting insert according to claim 1, wherein a clearance angle of the third flank increases in a direction from the first flank to the second flank.

6. The cutting insert according to claim 1,
wherein the third flank comprises a upper flank and a middle flank and a lower flank arranged in the thickness direction in this order such that the the upper flank and the middle flank and the lower flank of the third flank respectively correspond to the upper flank, middle flank, and lower flank of the first flank adjacent to the third flank, and
wherein an inequality $\theta1<\theta2$ is satisfied, $\theta1$ is a clearance angle of the upper flank of the third flank and $\theta2$ is a clearance angle of the lower flank of the third flank.

7. The cutting insert according to claim 6,
wherein an inequality $\theta1<\theta3<\theta2$ is satisfied, $\theta3$ is a clearance angle of the middle flank of the third flank.

8. The cutting insert according to claim 7,
wherein inequalities $\alpha<\theta1<\epsilon$, $\beta<\theta3<\epsilon$ and $\gamma<\theta2<\epsilon$.

9. The cutting insert according to any claim 1,
wherein the upper surface comprises a first corner and a second corner adjacent to the first corner,
wherein the cutting insert comprises a first portion and a second portion, both of the first portion and the second portion comprising the first cutting edges and the second cutting edges and the third cutting edges,
wherein the third cutting edge of the first portion is disposed at the first corner and the third cutting edge of the second portion is disposed at the second corner,
wherein the first cutting edge of the first portion is adjacent to the second cutting edge of the second portion, and
wherein the flank comprises a fourth flank between the first flank corresponding to the first cutting edge of the first portion and the second flank corresponding to the second cutting edge of the second portion, the fourth flank having a clearance angle that increases in the direction from the first flank to the second flank.

10. The cutting insert according to claim 9, wherein, in side view, a dimension of the fourth flank in a width direction is the smallest on the upper surface side.

11. The cutting insert according to claim 9, wherein the fourth flank comprises three surfaces respectively corresponding to the upper flank, the middle flank, and the lower flank of the first flank.

12. The cutting insert according to claim 1, further comprising a groove in the first flank, the groove extending in the thickness direction, comprising one end in the upper surface, and dividing the first cutting edge.

13. The cutting insert according to claim 12, wherein the groove comprises the other end in the lower surface, and a width of the groove increases in a direction from a boundary between the middle flank and the lower flank to the lower surface.

14. A cutting tool comprising a holder and the cutting insert according to claim 1, the cutting insert being mounted on a tip of the holder,
wherein the second cutting edge of the cutting insert is substantially perpendicular to an axis of the holder.

15. A method of cutting a work material, comprising the steps of:
rotating at least one of the cutting tool according to claim 14 and the work material and bringing the work material and the cutting tool close to each other;
making a cutting edge of the cutting tool contact a surface of the work material and cutting the work material; and
separating the cutting tool from the work material.

* * * * *